Aug. 4, 1959   H. H. HAAS   2,897,802
ENGINE CONSTRUCTION
Filed July 16, 1957   2 Sheets-Sheet 1
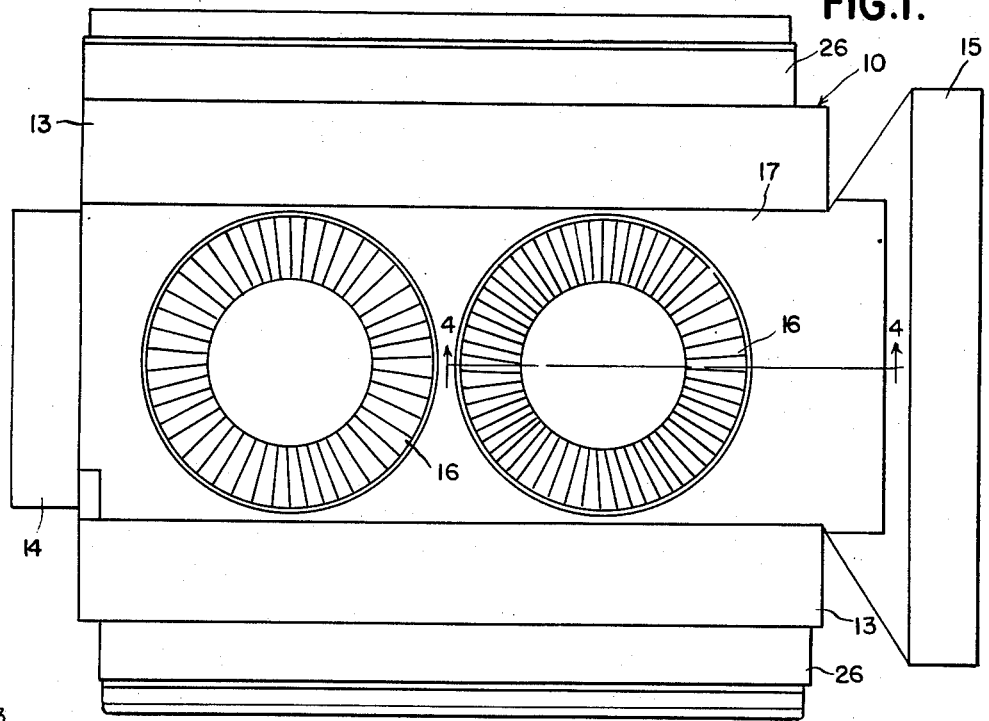
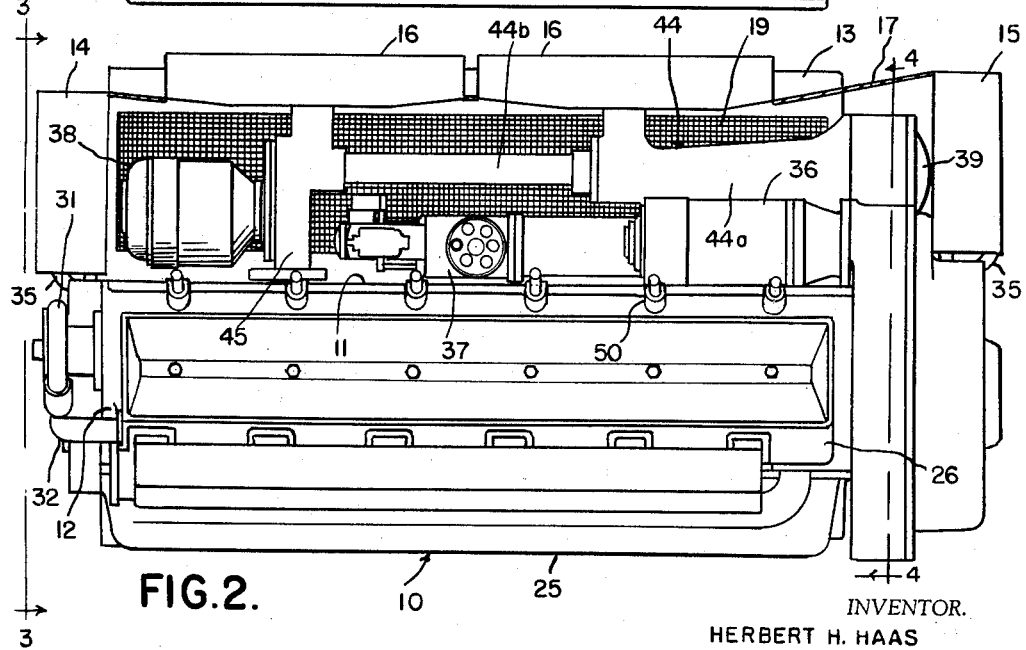
INVENTOR.
HERBERT H. HAAS
BY
Hauker Hardety
ATTORNEYS Aug. 4, 1959  H. H. HAAS  2,897,802
ENGINE CONSTRUCTION
Filed July 16, 1957  2 Sheets-Sheet 2

INVENTOR.
HERBERT H. HAAS
BY
*Hauke & Hardesty*
ATTORNEYS

United States Patent Office 2,897,802
Patented Aug. 4, 1959

2,897,802

ENGINE CONSTRUCTION

Herbert H. Haas, Royal Oak, Mich., assignor, by mesne assignments, to Continental Motors Corporation, Muskegon, Mich., a corporation of Virginia Application July 16, 1957, Serial No. 672,335

8 Claims. (Cl. 123—41.49)

My invention relates to engine constructions and more particularly to a basic sealed unit power package configuration for liquid cooled internal combustion engines.

Key aims in the production of internal combustion engines, particularly high powered types such as multi-cylinder diesel engines for heavy military and industrial engines, are simplicity from the viewpoints of manufacture, maintenance and repair, and compactness in meeting requirements of restricted space envelopes. In the development of liquid cooled engines, a great many problems are presented which complicate attempts at providing engines comparable in size and weight with air-cooled engines of similar power output.

For example, conventional liquid cooling systems require utilization of radiators and plumbing that conventionally add to the overall dimensions of the engine, increases weight, and interfere with maintenance and repair of the engine, other engine components becoming less accessible. Additionally, the fact that all the plumbing must be disconnected in order to replace the engine in the vehicle increases time and cost of maintenance as well as engendering problems of sealing when the plumbing is later reconnected.

An object of the present invention is to improve liquid cooled engine construction by providing a sealed unit power package configuration in which the entire cooling system is integrally constructed with the engine.

Another object of the invention is to construct a compact liquid cooled internal combustion engine by providing coolant-jacketed horizontally opposed cylinder blocks with integral radiators to form an elongated, substantially box-like power package.

A further object of the invention is to simplify construction of liquid cooled internal combustion engines by constructed jacketed horizontally opposed cylinder blocks, each block provided with its own integral cooling system including radiator, cooling pump, thermostat, and other related components.

A still further object of the invention is to facilitate maintenance and repair of liquid-cooled internal combustion engines by constructing an elongated substantially box-like sealed unit power package in which a crankcase and horizontally opposed cylinder blocks are provided with spaced substantially vertical cooling radiators with a cooling air fan structure intermediate same and spaced from the cylinder block to form an intermediate air space in which are located engine accessories and the cooling fan drive means.

For a more complete understanding of the invention, reference may be had to the accompanying drawings illustrating a preferred embodiment of the invention in which like reference characters refer to like parts throughout the several views and in which—

Fig. 1 is a top plan view of a preferred 12-cylinder engine constructed according to the invention.

Fig. 2 is an elevational side view of the engine of Fig. 1 with a side radiator removed for clarity.

Figure 3:
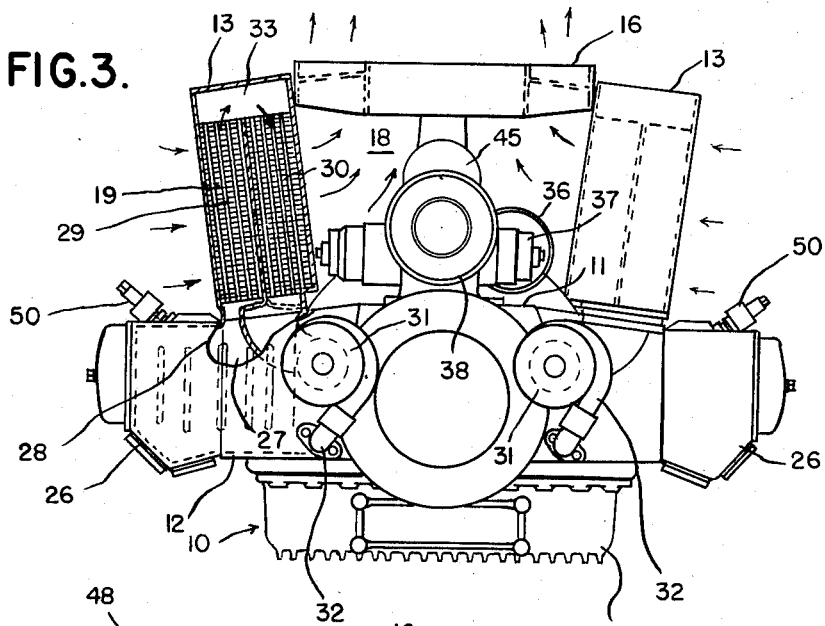
Fig. 3 is an elevational end view of the engine taken from the line 3—3 of Fig. 2 and with the forward radiator removed for clarity.

A liquid cooled internal combustion engine 10 is illustrated as comprising basically an elongated box-like sealed unit power package having a horizontally disposed base including a central crankcase structure 11 and substantially horizontally opposed cylinder structures 12 integrally formed therewith, substantially vertically disposed side radiators or engine coolant cooler structures 13, substantially vertically disposed end radiators or oil cooler structures 14 and 15, and a pair of cooling air fan structures 16 vertically spaced from the crankcase 11 and enclosed by means of a shroud structure 17.

The aforesaid structures 11 through 17 are integrally constructed and arranged to provide an intermediate airspace 18, so that cooling air, preferably passing from atmosphere through substantially lateral air passages 19 provided in the cooler structures 13, 14 and 15, enters the airspace 18 and is then exhausted to the atmosphere through the fan structures 16, as indicated by the directional arrows in Fig. 3. It will be apparent that the cooling air could be blown in the opposite direction if desired.

To this box-like basic power package are added an oil pan 25 and cylinder head structures 26. The cylinder structures 12 and the cylinder head structures 26 are provided respectively with interconnected coolant jackets 27 and 28, and the side cooler structures 13 are integrally mounted on the cylinder structures 12 so that substantially vertical inlet coolant passages 29 are in open communication with the cylinder coolant jackets 27. Each cooler structure 13 is preferably constructed to have separated inlet passages 29 aforesaid and outlet passages 30, the outlet passages 30 being directly connected to the intake side of a coolant pump 31 of any preferred construction. An outlet pipe 32 directs coolant from the pump 31 back into the cylinder coolant jacket 27. The inlet and outlet passages 29 and 30 respectively are preferably in communication through an upper header portion 33 of the cooler structure 13.

Engine coolant thus circulates from the pump 31 into the coolant jackets 27 and 28 and thence directly into the cooler inlet passages 29, to rise and overflow into the outlet passages 30, from which it is directly drawn into the pump 31 again. This arrangement eliminates the need for practically all plumbing normally required for liquid cooled engines.

The end radiators 14 and 15 may be utilized for any desired purpose, or they may be replaced by shrouds. In the present construction they are conveniently situated for use, respectively, as engine oil and transmission oil coolers, being connected to the ends of the crankcase by any means such as the short pipes 35 shown in Fig. 2.

Figure 4:
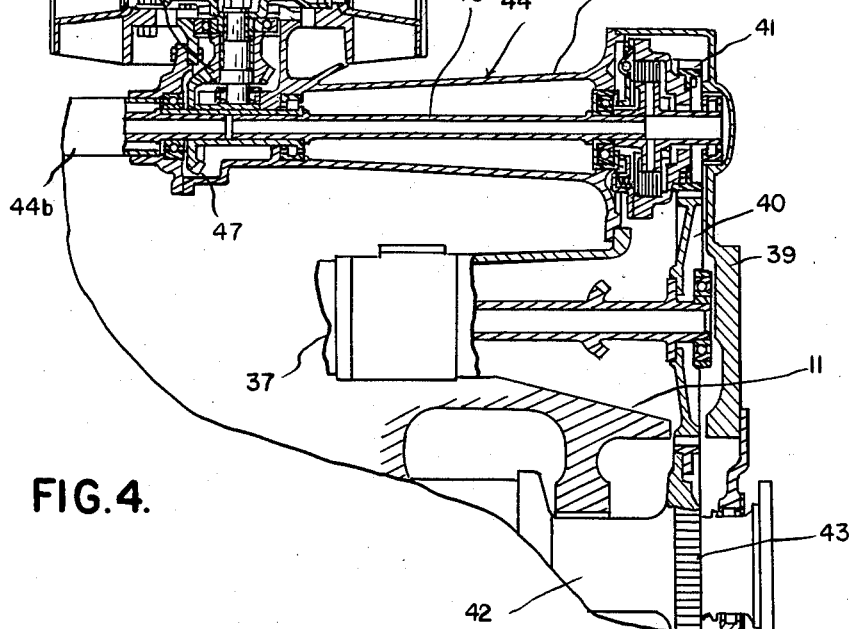
Fig. 4 is a fragmentary cross-sectional view of the fan and accessory drive section taken substantially on the line 4—4 of Fig. 1.

The airspace 18 not only provides for efficient circulation of air but also provides space for disposition of engine accessories, such as a starter 36, fuel injection pumps 37, and a generator 38. An engine accessory drive housing 39 is preferably mounted on the flywheel end of the crankcase 11 and carries accessory and fan drive means such as interconnected gears 40 and 41 respectively, as illustrated in Fig. 4. A crankshaft 42 is supported in the crankcase 11 and preferably has a drive gear 43 drivingly connected to the gear 40.

A multiple fan support housing 44 comprising preferably tubular sections 44a and 44b is supported at one end by the accessory drive housing 39 and at the other end by a second accessory drive housing 45 on which the generator 38 is preferably mounted. The housing 44 carries a multiple section shaft 46 driven by the gear 41 and carrying a fan drive gear 47, which in turn drives the fan 16 through a gear 48. The fan support housing is thus seen to bridge accessories such as the pump 37 and be independent thereof, without interfering with the air flow through the airspace 18.

The particular accessory and fan driving arrangement may be altered to suit the needs of the engine while the basic configuration of the sealed box-like integral power plant remains as described.

Although I have described but one preferred embodiment of the invention, it will be apparent to one skilled in the art to which the invention pertains that various changes and modifications may be made therein without departing from the spirit of the invention or the scope of the appended claims.

I claim:

1. An internal combustion engine comprising a crankcase structure and substantially horizontally opposed cylinder block structures integral therewith, each of said cylinder block structures having a coolant jacket and a substantially vertically disposed radiator structure mounted directly on the upper face of said coolant jacket and directly openly connected therewith, said radiators being laterally spaced from each other, a cooling air fan structure disposed between said spaced radiator structures and vertically spaced from the upper surface of said crankcase structure, said radiators, cooling air fan, and crankcase and cylinder block structures constructed and arranged to form an elongated substantially box-like integral power plant package enclosing an intermediate air space, and means circulating engine coolant through said cooling jacket and radiator structures.

2. An internal combustion engine comprising a crankcase structure and substantially horizontally opposed cylinder block structures integral therewith, each of said cylinder block structures having a coolant jacket and a substantially vertically disposed radiator structure mounted directly on the upper face of said coolant jacket and directly openly connected therewith, said radiators being laterally spaced from each other, a cooling air fan structure disposed between said spaced radiator structures and vertically spaced from the upper surface of said crankcase structure, said radiators, cooling air fan, and crankcase and cylinder block structures constructed and arranged to form an elongated substantially box-like integral power plant package enclosing an intermediate air space, and means circulating engine coolant through said coolant jacket and radiator structures, a crankshaft carried in said crankcase, and driving means disposed in said intermediate air space and operatively connected with said cooling air fan structure and said crankshaft.

3. An internal combustion engine comprising a crankcase structure and substantially horizontally opposed cylinder block structures integral therewith, each of said cylinder block structures having a coolant jacket and a substantially vertically disposed radiator structure mounted directly on the upper face of said coolant jacket and directly openly connected therewith, a cooling air fan structure disposed laterally intermediate said radiator structures and spaced from the upper surface of said crankcase structure, said radiators, cooling air fan, and crankcase and cylinder block structures constructed and arranged to form an elongated substantially box-like integral power plant package enclosing an intermediate air space, and means circulating engine coolant through said coolant jacket and radiator structures, said radiator structures having air passages constructed and arranged for substantially lateral air flow between said intermediate airspace and the exterior of said engine, and said cooling air fan structure constructed and arranged to provide substantially vertical air flow between said intermediate airspace and the exterior of said engine, and shroud structures secured to said engine for confining cooling air to the aforesaid lateral and vertical air flow paths.

4. In an internal combustion engine comprising a crankcase structure and substantially horizontally opposed cylinder block structures integral therewith, each of said cylinder block structures having a coolant jacket and a substantially vertically disposed radiator structure mounted directly on the upper face of said coolant jacket and directly openly connected therewith, said radiators being laterally spaced from each other, a cooling air fan structure disposed between said spaced radiator structures and vertically spaced from the upper surface of said crankcase structure, said radiators, cooling air fan, and crankcase and cylinder block structures constructed and arranged to form an elongated substantially box-like integral power plant package enclosing an intermediate air space, and means circulating engine coolant through said coolant jacket and radiator structures, a crankshaft carried in said crankcase, and driving means disposed in said intermediate air space and operatively connected with said cooling air fan structure and said crankshaft, an accessory drive shaft disposed in said air space and operatively connected at one end with said crankshaft, and engine accessory structures disposed in said air space and having driven elements operatively connected with said accessory drive shaft, said fan being operable to circulate cooling air in said air space and in heat exchange relation with said accessory structures to provide the predominant cooling means therefor.

5. An internal combustion engine constructed and arranged to form a substantially box-like sealed unit power plant package enclosing an intermediate air space, said engine comprising integrally related engine components; namely a base structure having a crankcase and substantially horizontally opposed cylinder blocks having coolant jackets substantially rectangularly disposed side structures including at least one vertically upstanding radiator integrally mounted on and connected with each of said cylinder block coolant jackets, and a horizontally disposed top structure vertically spaced from said base structure and including at least one air cooling fan constructed and arranged to circulate cooling air in said airspace and in heat exchange relation with said radiator.

6. An internal combustion engine comprising a crankcase structure, horizontally opposed longitudinal cylinder block structures having coolant jackets, an upstanding radiator structure integrally mounted atop each of said coolant jackets, and a cooling fan structure overlying said cylinder block and disposed in a horizontal plane spaced therefrom to provide an air space defined by said cylinder block, radiators and fan structure, said fan structure having a fan operable to circulate air in said airspace and in heat exchange relation with said radiators.

7. In an internal combustion engine comprising a crankcase structure and substantially horizontally opposed longitudinal cylinder block structures having coolant jackets, a radiator structure longitudinally integrally mounted on each of said coolant jackets and extending vertically therefrom, said radiators being laterally spaced one from the other and having lateral air passages for lateral flow of cooling air, said radiators and said coolant jackets having openly connected and aligned coolant ports, means circulating engine coolant through said coolant jackets and said radiators, and air induction means comprising a fan operably connected with said engine and disposed in the space between said radiators and vertically spaced from said crankcase to provide a substantially enclosed airspace, said fan being horizontally disposed and operable to induce cooling air flow vertically through said fan and laterally through said radiator air passages in heat transference relation with said radiators.

8. An internal combustion engine comprising an elongated substantially box-like integral power plant package having a bottom, sides, and a top, said bottom comprising laterally spaced upstanding radiator structures mounted in said base housing structure and having lateral air passages providing for lateral cooling air flow through said radiators, and said top comprising a horizontally positioned cooling fan structure, said structures being integrally constructed and arranged to enclose an intermediate air space, said cooling fan structure operable to circulate cooling air in said air space, laterally through said radiators, and vertically through said fan structure.

References Cited in the file of this patent

UNITED STATES PATENTS

| | | |
|---|---|---|
| 2,125,958 | Schmeller | Aug. 9, 1938 |
| 2,271,994 | Allen et al. | Feb. 3, 1942 |

FOREIGN PATENTS

| | | |
|---|---|---|
| 220,009 | Switzerland | Mar. 15, 1942 |